United States Patent
Tamura et al.

(10) Patent No.: US 9,403,227 B2
(45) Date of Patent: Aug. 2, 2016

(54) ELECTROCHEMICAL MACHINING TOOL AND ELECTROCHEMICAL MACHINING SYSTEM

(71) Applicant: MITSUBISHI HEAVY INDUSTRIES, LTD., Tokyo (JP)

(72) Inventors: Kazuhisa Tamura, Tokyo (JP); Yosuke Mukai, Tokyo (JP); Shin Asano, Tokyo (JP); Tetsuhei Kobayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 154 days.

(21) Appl. No.: 14/343,303

(22) PCT Filed: Nov. 28, 2012

(86) PCT No.: PCT/JP2012/080732
§ 371 (c)(1),
(2) Date: Mar. 6, 2014

(87) PCT Pub. No.: WO2013/081000
PCT Pub. Date: Jun. 6, 2013

(65) Prior Publication Data
US 2015/0231717 A1    Aug. 20, 2015

(30) Foreign Application Priority Data
Nov. 29, 2011    (JP) ................. 2011-260041

(51) Int. Cl.
*B23H 3/06*    (2006.01)
*B23H 9/14*    (2006.01)
(Continued)

(52) U.S. Cl.
CPC .. *B23H 3/04* (2013.01); *B23H 3/06* (2013.01); *B23H 9/14* (2013.01); *B23H 9/16* (2013.01)

(58) Field of Classification Search
CPC .............. B23H 3/04; B23H 3/06; B23H 9/14; B23H 9/16
USPC ............................................. 204/224 M, 284
See application file for complete search history.

(56) References Cited

U.S. PATENT DOCUMENTS 5,059,289 A    10/1991 Gaskell
2011/0070096 A1    3/2011 Wei et al.

FOREIGN PATENT DOCUMENTS

CN    1943951 A    4/2007
CN    101015874 A    8/2007
(Continued)

OTHER PUBLICATIONS

Office Action dated May 22, 2015, issued in counterpart Chinese application No. 2012800428028, with English translation. (19 pages).

(Continued)

*Primary Examiner* — Nicholas A Smith
(74) *Attorney, Agent, or Firm* — Westerman, Hattori, Daniels & Adrian, LLP (57) ABSTRACT

An electrochemical machining tool includes a tool main body which includes an electrode having a tubular shape extending along an axis and formed of a conductive material having flexibility, the electrode through which an electrolyte flows toward a distal end side, and an insulating layer coated on an outer circumferential surface of the electrode so as to expose a distal end surface of the electrode. In the electrochemical machining tool, a hole part serving as a fluid discharge part configured to discharge the electrolyte flowing through inside of the electrode toward the outside in the radial direction of the tool main body is formed at a portion of a position in the circumferential direction of the tool main body.

17 Claims, 9 Drawing Sheets

(51) Int. Cl.
*B23H 9/16* (2006.01)
*B23H 3/04* (2006.01)

(56) References Cited

FOREIGN PATENT DOCUMENTS

| | | | |
|---|---|---|---|
| DE | 199 29 023 | A1 | 9/2000 |
| GB | 1130561 | A | 10/1968 |
| JP | 46-6332 | B | 2/1971 |
| JP | 46-26846 | B | 8/1971 |
| JP | 47-33840 | A | 11/1972 |
| JP | 50-101998 | A | 8/1975 |
| JP | 50-33025 | B | 10/1975 |
| JP | 59-191220 | U | 12/1984 |
| JP | 07-051948 | A | 2/1995 |
| JP | 07-314258 | A | 12/1995 |
| JP | 2008-038774 | A | 2/2008 |
| JP | 2011-062811 | A | 3/2011 |
| JP | 2011-177819 | A | 9/2011 |

OTHER PUBLICATIONS

Office Action dated Jun. 2, 2015, issued in counterpart Korean application No. 10-2014-7005720, with English translation. (10 pages).

Written Opinion dated Feb. 26, 2013, issued in International Patent Application No. PCT/JP2012/080732 With English Translation (7 pages).

Extended European Search Report dated Apr. 2, 2015, issued in corresponding European Patent Application No. 12853554.9 (6 pages).

Office Action dated May 24, 2016, issued in counterpart Japanese Patent Application No. 2012-241918, with English translation (7 pages).

ELECTROCHEMICAL MACHINING TOOL AND ELECTROCHEMICAL MACHINING SYSTEM

TECHNICAL FIELD

The present invention relates to an electrochemical machining tool configured to melt and machine a workpiece by electrically connecting an electrode and the workpiece via an electrolyte, and an electrochemical machining system including the electrochemical machining tool.

Priority is claimed on Japanese Patent Application No. 2011-260041, filed Nov. 29, 2011, the content of which is incorporated herein by reference.

BACKGROUND ART

Perforation of a difficult-to-cut material, for which is mechanical machining is difficult, is generally performed by an electrochemical machining method or an electro-discharge processing method. In particular, when the difficult-to-cut material having a high aspect ratio is perforated, the electrochemical machining method is used.

Here, for example, in a turbine blade of a gas turbine, a cooling hole configured to flow a coolant to cool the turbine blade is formed. In order to increase cooling efficiency by the cooling hole, a shape of the cooling hole may be curved along a geometrical shape of the turbine blade. However, while the electrochemical machining method with respect to the turbine blade of the related art is appropriate for formation of a linear hole, it is difficult to form a machined hole having a curved shape, i.e., a curved hole. Here, when the cooling hole is formed in the turbine blade, two linear holes are respectively formed to be connected to form a pseudo-curved hole.

Meanwhile, for example, in Patent Literature 1, a curved hole machining apparatus configured to machine a curved hole is disclosed. In the curved hole machining apparatus, a difference in a machining amount is generated at a position in a circumferential direction of a machining electrode tool by covering a surface of the machining electrode tool by an insulating member except for a portion thereof. Accordingly, as the machining electrode tool moves toward a side at which a machining amount is large, the curved hole is formed.

CITATION LIST

Patent Literature

[Patent Literature 1] Japanese Unexamined Patent Application, First Publication No. H07-51948

SUMMARY OF INVENTION

Technical Problem

However, in the technique disclosed in Patent Literature 1, a direction of advancement is determined by a difference in a machining amount between a portion of the surface of the machining electrode tool covered by the insulating member and a portion not covered thereby. Accordingly, a direction in which the curved hole is formed cannot be arbitrarily adjusted. That is, since an area of the portion of the surface of the machining electrode tool of the portion covered by the insulating member and an area of the portion not covered thereby are fixed, the difference in the machining amount cannot be varied and the curved hole having a desired curvature cannot be easily formed.

In consideration of the above-mentioned circumstances, the present invention is directed to provide an electrochemical machining tool and an electrochemical machining system that are capable of easily forming a curved hole having a desired curvature.

Solution to Problem

An electrochemical machining tool according to a first aspect of the present invention includes a tool main body which includes an electrode having a tubular shape extending along an axis and formed of a conductive material having flexibility, the electrode through which an electrolyte flows toward a distal end side, and an insulating layer coated on an outer circumferential surface of the electrode so as to expose a distal end surface of the electrode, wherein a fluid discharge part configured to discharge the electrolyte flowing through inside of the electrode toward the outside in the radial direction of the tool main body is formed at a portion of a position in the circumferential direction of the tool main body.

According to the above-mentioned electrochemical machining tool, as electrical connection between the distal end surface of the electrode and the inner surface of the machined hole of the workpiece is performed via the electrolyte, the workpiece is melted and the machined hole is more deeply machined.

Then, the electrolyte flowing through the electrode is discharged from the distal end of the electrode, and a portion thereof is discharged from the fluid discharge part toward the outside in the radial direction of the tool main body. Here, as the electrolyte discharged from the fluid discharge part applies a fluid acting force to the inner surface of the machined hole, a reaction force is applied to the tool main body. Accordingly, the tool main body is displaced to be curved in a direction of the reaction force, and current density distribution between the distal end surface of the electrode and the inner surface of the machined hole is locally increased according to the displacement amount. As a result, the machining amount of the side at which the tool main body at the position in the circumferential direction of the tool main body is displaced by the reaction force is increased.

In addition, since a magnitude of the reaction force applied to the tool main body is a value according to the flow rate of the electrolyte flowing through the electrode, the displacement amount of the tool main body can be determined by adjusting the flow rate of the electrolyte.

The fluid discharge part of the electrochemical machining tool may be a hole part passing through the electrode and the insulating layer in the radial direction.

Accordingly, since the fluid acting force can be securely applied to the inner surface of the machined hole, the reaction force can be securely obtained. In addition, since the fluid acting force and the reaction force to the inner surface of the machined hole can be easily increased as the electrolyte is throttled by the hole part, the tool main body can be largely displaced. Accordingly, in particular, the curved hole having a large curvature can be easily formed.

The fluid discharge part of the electrochemical machining tool may be a cutout part cut out from a distal end of the tool main body toward a rear end.

In this way, as described above, since the fluid acting force can be securely applied to the inner surface of the machined hole, the reaction force can be securely obtained. In addition, in comparison with the case in which the hole part is used as the fluid discharge part, since variations of the fluid acting force and the reaction force to the inner surface of the machined hole by the variation in flow rate of the electrolyte are small, fine adjustment of the curvature of the curved hole can be easily performed.

In the electrochemical machining tool, a non-insulating part configured to expose an outer circumferential surface of the electrode to the outside in the radial direction may be formed at a portion of an opposite side of the fluid discharge part at the position in the circumferential direction of the tool main body with the axis sandwiched therebetween.

Accordingly, in addition to electrical connection between the distal end surface of the electrode and the inner surface of the machined hole, since electrical connection between the portion to which the outer circumferential surface of the electrode is exposed and the inner surface of the machined hole occurs, current density distribution of the side at which the non-insulating part at the position in the circumferential direction of the electrode is formed can be further increased.

Accordingly, since the machining amount of the side at which the non-insulating part is formed can be further increased, the machined hole is more deeply machined toward the side at which the machining amount is large, and the curved hole that is further curved can be formed.

In the electrochemical machining tool, a thickness of the portion of the opposite side of the fluid discharge part with the axis sandwiched therebetween may be set to be larger than the thickness of the portion of the fluid discharge part side at the position in the circumferential direction of the electrode.

Accordingly, since the current density distribution between the portion having a thickness larger than that of the distal end surface of the electrode and the inner surface of the machined hole is increased, the machining amount of the portion having the large thickness of the electrode at the position in the circumferential direction of the tool main body can be increased. Accordingly, as the machined hole is more deeply machined toward the side at which the machining amount is large, the curved hole that is further curved can be formed.

The electrochemical machining tool may further include a distal end lid portion formed of a conductive material and configured to close a distal end opening of the electrode.

Accordingly, according to electrical connection between the distal end lid portion connected to the electrode and the inner surface of the machined hole, the workpiece is melted and the machined hole is more deeply formed. When the distal end lid portion is installed as described above, since a discharge amount of the electrolyte from the fluid discharge part is increased, the fluid acting force and the reaction force to the inner surface of the machined hole can be increased. Accordingly, in particular, the curved hole having a large curvature can be easily formed.

The distal end lid portion of the electrochemical machining tool may be stacked on the distal end surface to expose the portion of the fluid discharge part side of the distal end surface of the electrode to the distal end side.

As the distal end lid portion is disposed disproportionately toward the opposite side of the fluid discharge part at the position in the circumferential direction of the tool main body, current density distribution between the distal end lid portion and the inner surface of the machined hole is increased at the opposite side of the fluid discharge part. Accordingly, since the machining amount of the opposite side of the fluid discharge part at the position in the circumferential direction of the tool main body is increased, the machined hole is more deeply machined toward the side at which the machining amount is large, and the curved hole that is further curved can be formed.

An electrochemical machining tool according to a second aspect of the present invention includes a tool main body which includes an electrode having a tubular shape extending along an axis and formed of a conductive material having flexibility, the electrode through which an electrolyte flows toward a distal end side, and an insulating layer coated on only an outer circumferential surface of the electrode so as to expose a distal end surface of the electrode, wherein a convex part protruding from the outer circumferential surface of the insulating layer toward the outside in the radial direction may be formed at a portion in a circumferential direction of the tool main body.

In the electrochemical machining tool having the above-mentioned features, according to electrical connection between the distal end surface of the electrode and the inner surface of the machined hole in the workpiece via the electrolyte, the workpiece is melted and the machined hole is more deeply machined.

Then, when the tool main body is moved toward the machined hole, as the convex part of the portion in the circumferential direction of the tool main body abuts the inner surface of the machined hole, the reaction force is applied to the tool main body toward the opposite side of the convex part. Accordingly, the tool main body is displaced to be curved in the direction of the reaction force, the current density distribution between the distal end surface of the electrode and the inner surface of the machined hole is locally increased according to the displacement amount, and thus the machining amount of the side at which the tool main body is displaced is increased.

Then, since the magnitude of the reaction force applied to the tool main body is increased according to a magnitude of a force of pushing the electrode, the displacement amount of the tool main body can be determined by adjusting the force of pushing the electrode.

In the electrochemical machining tool, a non-insulating part configured to expose the outer circumferential surface of the electrode to the outside in the radial direction may be formed at a portion of an opposite side of the convex part at the distal end of the tool main body with the axis sandwiched therebetween.

Accordingly, as described above, the curved hole that is further curved can be formed.

The non-insulating part of the electrochemical machining tool may be formed at a position spaced apart from the distal end of the tool main body to the rear end side.

While the distal end of the electrochemical machining tool moving into the machined hole is likely to come in contact with the inner surface of the machined hole, in the present invention, as the non-insulating part is formed at a position spaced apart from the distal end toward the rear end, the insulating layer is present at the distal end of the outer circumferential surface of the electrochemical machining tool. Accordingly, direct contact of the distal end of the electrode in the electrochemical machining tool with the inner surface of the machined hole can be avoided, i.e., contact probability between the electrode and the inner surface of the machined hole can be decreased. Accordingly, since a short circuit occurrence frequency between the electrode and the inner surface of the machined hole can be decreased, machinability can be improved.

The plurality of non-insulating parts of the electrochemical machining tool may be formed to be spaced apart from each other in the axial direction.

Accordingly, the short circuit occurrence frequency between the electrode and the inner surface of the machined hole can be decreased while further increasing the current density distribution.

In the electrochemical machining tool, the plurality of non-insulating parts is formed to be spaced apart from each other in the circumferential direction.

As described above, the short circuit occurrence frequency between the electrode and the inner surface of the machined hole can be decreased while further increasing the current density distribution.

An electrochemical machining system according to a third aspect of the present invention includes any one of the above-mentioned electrochemical machining tools; a guide unit configured to guide the electrochemical machining tool so that the electrochemical machining tool is formed with respect to a workpiece in a predetermined direction of advancement; and a moving mechanism configured to move the electrochemical machining tool to advance.

In a state in which the guide unit can guide the electrochemical machining tool, as the moving mechanism moves the electrochemical machining tool to advance, the machined hole can be formed with respect to the workpiece at a desired position and a desired angle. In addition, after the tool main body of the electrochemical machining tool is inserted into the machined hole, as a difference in the machining amount at the position in the circumferential direction of the tool main body occurs as described above, the curved hole having a desired curvature can be formed.

Advantageous Effects of Invention

According to the electrochemical machining tool and the electrochemical machining system, a machining amount of a side at which the tool main body is displaced is increased by a reaction force of the electrolyte discharged from the fluid discharge part. Accordingly, since the machined hole is machined to be further deepened toward the side at which the machining amount is large, the curved hole can be easily formed. In addition, since the displacement amount of the tool main body can be determined by adjusting the flow rate of the electrolyte, the curved hole having a desired curvature can be easily formed by varying a value of the flow rate.

In addition, according to the electrochemical machining tool and the electrochemical machining system of the present invention, the machining amount of the side at which the tool main body is displaced is increased according to the reaction force applied to the tool main body via the convex part. Accordingly, since the machined hole is machined to be further deepened toward the side at which the machining amount is large, the curved hole can be easily formed. In addition, since the displacement amount of the tool main body can be determined by adjusting a pushing force of the tool main body, the curved hole having a desired curvature can be easily formed by varying the pushing force.

DESCRIPTION OF EMBODIMENTS

Hereinafter, a first embodiment of the present invention will be described in detail with reference to the accompanying drawings.

Figure 1:
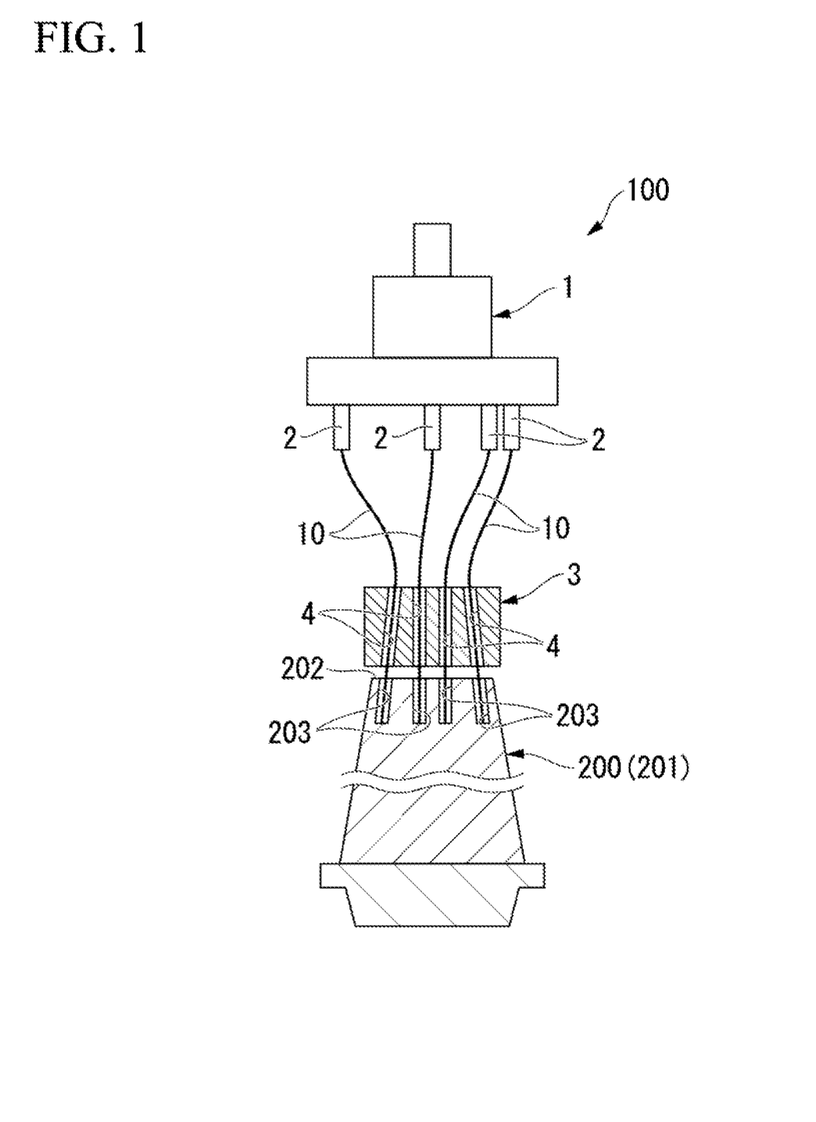
FIG. 1 is a schematic configuration view of an electrochemical machining system according to a first embodiment of the present invention.

As shown in FIG. 1, an electrochemical machining system 100 of the first embodiment is an apparatus for forming a machined hole 203, which is a curved hole, in a workpiece 200. In the embodiment, an example in which a cooling hole configured to cool a turbine blade 201 is formed as a machined hole 203 using the turbine blade 201 of the gas turbine as the workpiece 200 will be described.

The electrochemical machining system 100 includes a moving mechanism 1, a guide unit 3, and a plurality of electrochemical machining tools 10. The electrochemical machining system 100 may have a configuration including only one electrochemical machining tool 10.

The moving mechanism 1 has a function of moving the electrochemical machining tool 10 to advance and retract with respect to the workpiece 200. The moving mechanism 1 of the embodiment is disposed at a distal end 202 side of the turbine blade 201 serving as the workpiece 200, and is configured to advance and retract with respect to the distal end 202 of the turbine blade 201.

The advance and retraction of the moving mechanism 1 are performed by output of a driving source such as an electric motor or the like (not shown). An acceleration of advance and retraction of the moving mechanism 1, i.e., an output of the driving source, is controlled by a pushing force control device (not shown). Accordingly, the pushing force when the moving mechanism 1 moves the electrochemical machining tool 10 to advance and retract, i.e., when pushed toward the machined hole 203, can be arbitrarily adjusted.

Figure 2:
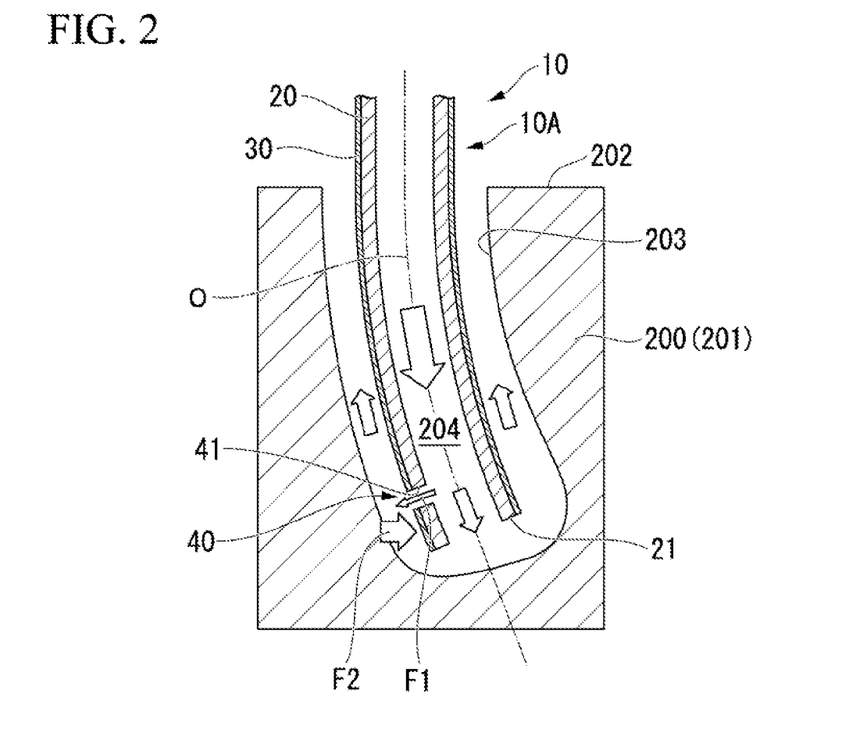
FIG. 2 is a longitudinal cross-sectional view of the electrochemical machining tool according to the first embodiment of the present invention.

The moving mechanism 1 has a plurality of grip units 2 formed at a surface thereof near the workpiece 200 and configured to grip a rear end of the electrochemical machining tool 10. The grip unit 2 has a tubular shape having a hollow inner part and is configured to grip the electrochemical machining tool 10 as a rear end of the electrochemical machining tool 10 is inserted into one end side of the grip unit 2. The other end side of the grip unit 2 is connected to an electrolyte circulation path, and an electrolyte 204 (see FIG.

2) is supplied into the grip unit 2 via the electrolyte circulation path. A supply amount of the electrolyte 204 can be arbitrarily adjusted by a flow rate control device (not shown). In addition, for example, sulfuric acid, nitric acid, a saline solution, or the like, may be used as the electrolyte 204.

The guide unit 3 is disposed between the moving mechanism 1 and the distal end (a tip shroud) 202 of the turbine blade 201, which is the workpiece 200. The guide unit 3 guides the electrochemical machining tool 10 moved to advance and retreat by the moving mechanism 1 to be directed in a predetermined direction of advancement with respect to the distal end 202 of the turbine blade 201. A plurality of guide holes 4 configured to bring the moving mechanism 1 side in communication with the workpiece 200 side are punched in the guide unit 3. The electrochemical machining tools 10 are inserted into these guide holes 4 from the moving mechanism 1 side toward the workpiece 200. As the electrochemical machining tool 10 is moved to advance by the moving mechanism 1, the electrochemical machining tool 10 can be introduced at a desired position in the distal end 202 of the turbine blade 201 and a desired angle with respect to the distal end 202 according to disposition of the guide holes 4.

Next, a configuration of the electrochemical machining tool 10 will be described.

As shown in FIG. 2, the electrochemical machining tool 10 is configured to form the machined hole 203 serving as a cooling hole in the turbine blade 201, which is the workpiece 200, through electrochemical machining, and includes a tool main body 10A having an electrode 20 and an insulating layer 30.

The electrode 20 is formed in a tubular shape (a cylindrical shape in the embodiment) extending along an axis O, and for example, is formed of a conductive material having flexibility such as stainless steel, copper, titanium, or the like. A hollow unit (the inside of the electrode 20) of the inner circumferential side of the electrode 20 is in communication with a hollow unit of the grip unit 2 of the moving mechanism 1. Accordingly, the electrolyte 204 provided for the electrolytic machining flows through the electrode 20 from a rear end side (the moving mechanism 1 side) toward a distal end side (the workpiece 200 side). A distal end surface 21 of the electrode 20 has a flat shape perpendicular to the axis O.

The insulating layer 30 is covered on an outer circumferential surface 23 of the electrode 20, and for example, is formed of a polyester-based resin or the like having electric insulation. The insulating layer 30 is covered substantially throughout a circumferential direction and the axis O direction of the outer circumferential surface of the electrode 20. In addition, the insulating layer 30 is not coated on the distal end surface 21 of the electrode 20, and the distal end surface 21 is exposed to the outside toward the distal end side of the tool main body 10A.

A fluid discharge part 40 is formed in the tool main body 10A constituted by the electrode 20 and the insulating layer 30, and is disposed at a portion of a position in the circumferential direction, i.e., a portion of one side in a radial direction of the tool main body 10A. The fluid discharge part 40 discharges the electrolyte 204 flowing through the electrode 20 outward in the radial direction of the tool main body 10A.

In the embodiment, a hole part 41 configured to pass through the electrode 20 and the insulating layer 30 in the radial direction to bring the inside and the outside of the main body of the electrode 20 in communication with each other is adopted as the fluid discharge part 40.

Figure 3:
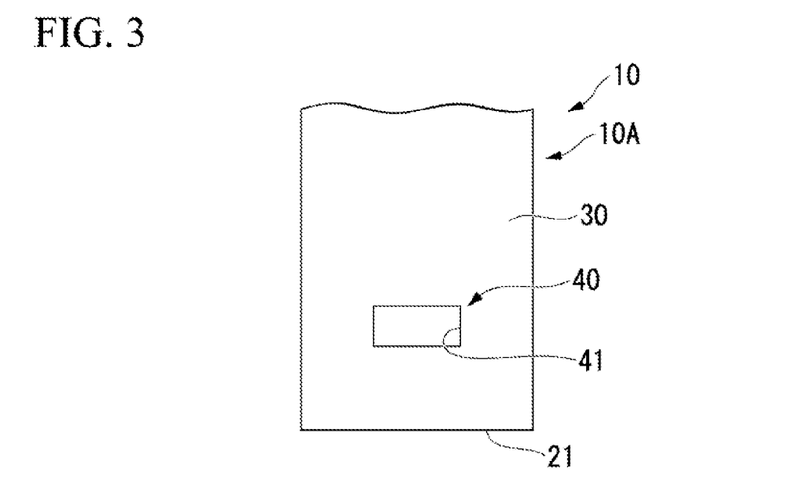
FIG. 3 is a side view of the electrochemical machining tool according to the first embodiment of the present invention, when seen from a hole part side serving as a fluid discharge part.

The hole part 41 serving as the fluid discharge part 40 may be formed at a distal end unit of the main body of the electrode 20. As shown in FIG. 3, a shape of the hole part 41 when seen in the radial direction of the tool main body 10A may be a rectangular shape in which the circumferential direction is set as a lengthwise direction and the axis O direction is set as a widthwise direction. In addition, the shape of the hole part 41 is not limited to the rectangular shape and, for example, may be another shape such as a circular shape, a square shape, or the like.

When the machined hole 203 is formed by the electrochemical machining system 100 including the electrochemical machining tool 10, the moving mechanism 1 is gradually moved toward the workpiece 200 while sequentially supplying the electrolyte 204 into the electrochemical machining tool 10 guided by the guide unit 3. Here, a flow rate of the electrolyte 204 is adjusted by a flow rate control device, and a pushing force of the electrochemical machining tool 10 is adjusted by a pushing force control device.

Then, the electrolyte 204 flowing through the electrode 20 in the electrochemical machining tool 10 is discharged from the distal end of the electrode 20, i.e., the distal end of the tool main body 10A, and a space between the tool main body 10A and the inner surface of the machined hole 203 is filled with the electrolyte 204.

Next, a voltage is applied between the electrode 20 of the tool main body 10A as a negative electrode and the workpiece 200 as a positive electrode by an electrical connection unit (not shown). As a result, as electrical connection occurs between the distal end surface 21 of the electrode 20 and the inner surface of the machined hole 203 of the workpiece 200 via the electrolyte 204, the workpiece 200 is melted. Accordingly, as the workpiece 200 is melted, the machined hole 203 is more deeply machined according to advancement of the electrochemical machining tool 10.

Here, in the electrochemical machining tool 10 of the embodiment, the electrolyte 204 flowing through the electrode 20 is discharged from the distal end of the electrode 20, and a portion thereof is discharged from the hole part 41 serving as the fluid discharge part 40 outward in the radial direction of the tool main body 10A.

Here, as the electrolyte 204 discharged from the hole part 41 applies a fluid acting force F1 to the inner surface of the machined hole 203, a reaction force F2 is applied to the tool main body 10A in a direction opposite to the fluid acting force F1. In the embodiment, since the electrolyte 204 is discharged toward one side in the radial direction of the tool main body 10A via the hole part 41, the reaction force F2 is applied to the other side in the radial direction of the tool main body 10A.

Then, since the electrode 20 has flexibility, the tool main body 10A is displaced to be curved in a direction of the reaction force F2. In the embodiment, since the hole part 41 serving as the fluid discharge part 40 is formed at the distal end unit of the tool main body 10A, the distal end unit of the tool main body 10A is displaced in a direction of the reaction force F2, i.e., toward the other side in the radial direction. Then, the distal end surface 21 of the electrode 20 and the inner surface of the machined hole 203 approach each other according to the magnitude of the displacement amount, and as a result, current density distribution between the distal end surface 21 of the electrode 20 and the inner surface of the machined hole 203 in a region at which they approach each other is locally increased. Accordingly, the machining amount of the side at which the tool main body 10A is displaced by the reaction force F2 at the position in the circumferential direction of the tool main body 10A is increased.

Here, the machined hole 203 is more deeply machined toward the side at which the machining amount by the electrochemical machining tool 10 is large. Accordingly, as the electrochemical machining tools 10 are sequentially pushed by the moving mechanism 1, the electrochemical machining tools 10 are moved toward the side at which the machining amount is large, i.e., the other side in the radial direction. That is, the electrochemical machining tool 10 is gradually curved toward the other side in the radial direction as it goes toward the inside of the machined hole 203. Accordingly, the curved hole can be easily formed.

Meanwhile, the magnitude of the reaction force F2 applied to the tool main body 10A has a value corresponding to the flow rate of the electrolyte 204 flowing through the electrode 20. That is, as the flow rate of the electrolyte 204 is increased, the flow rate of the electrolyte 204 discharged from the hole part 41 serving as the fluid discharge part 40 is also increased. Accordingly, as the flow rate of the electrolyte 204 is adjusted, a displacement amount to the other side in the radial direction of the distal end unit of the tool main body 10A can be determined. Accordingly, as the flow rate of the electrolyte 204 is arbitrarily varied by the flow control device, the curved hole having a desired curvature can be easily formed.

In addition, in the embodiment, since the hole part 41 is adopted as the fluid discharge part 40, as the electrolyte 204 is discharged to the outside in the radial direction of the tool main body 10A via the hole part 41, the fluid acting force F1 can be securely applied to the inner surface of the machined hole 203. Accordingly, the reaction force F2 can be securely obtained.

Further, since the fluid acting force F1 and the reaction force F2 to the inner surface of the machined hole 203 can be easily increased as the electrolyte 204 is throttled by the hole part 41, the tool main body 10A can be largely displaced. Accordingly, in particular, the curved hole having a large curvature can be easily formed.

Next, an electrochemical machining tool 11 of a second embodiment will be described with reference to FIGS. 4 and 5. In the second embodiment, the same components as of the first embodiment are designated by the same reference numerals, and detailed description thereof will not be repeated.

Figure 4:
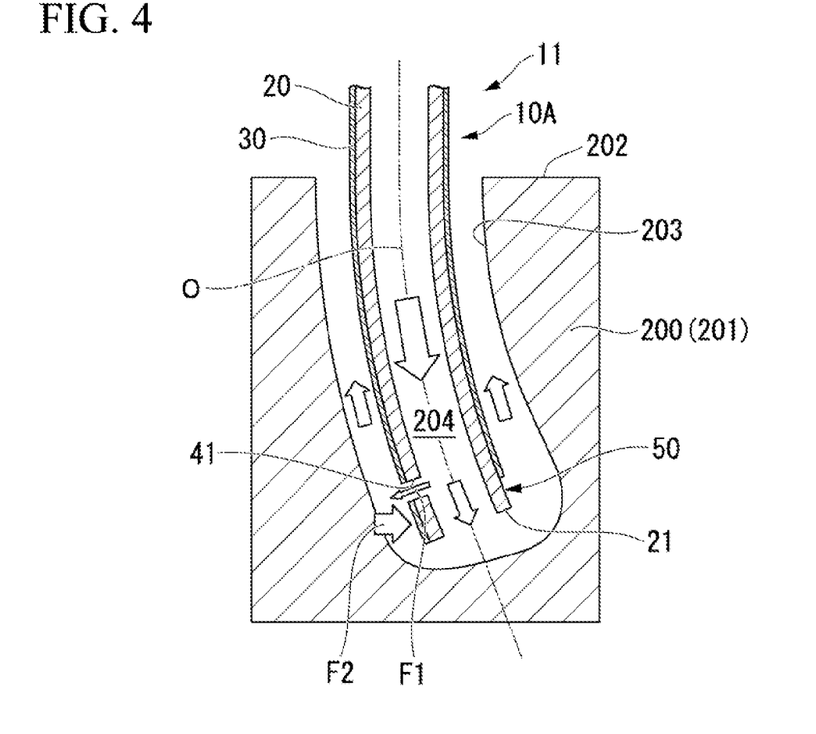
FIG. 4 is a longitudinal cross-sectional view of an electrochemical machining tool according to a second embodiment of the present invention.

As shown in FIG. 4, a non-insulating part 50 is formed at an outer circumferential side of the distal end unit of the tool main body 10A in the electrochemical machining tool 11 of the second embodiment.

That is, in the tool main body 10A, the non-insulating part 50 configured to expose the outer circumferential surface of the electrode 20 to the outside in the radial direction is formed at an opposite portion of the tool main body 10A of the fluid discharge part 40 at the position in the circumferential direction with the axis O sandwiched therebetween, i.e., a portion of the other side in the radial direction of the tool main body 10A.

Figure 5:
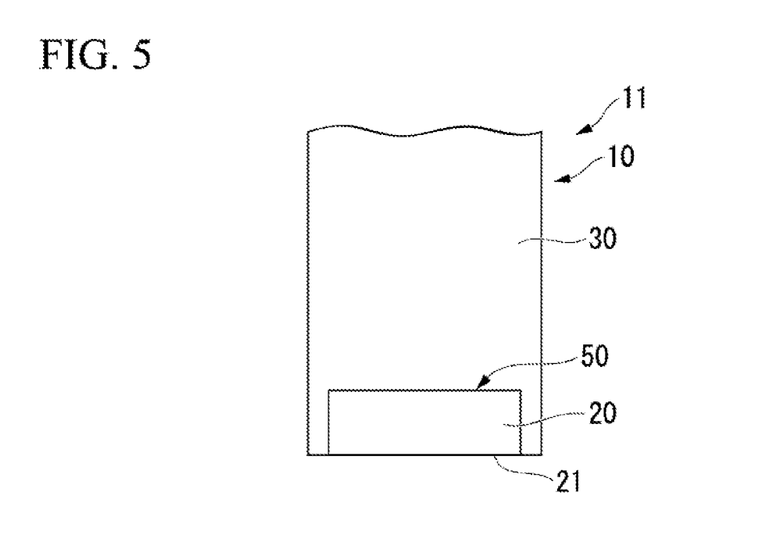
FIG. 5 is a side view of the electrochemical machining tool according to the second embodiment of the present invention, when seen from a non-insulating part side.

In the embodiment, as shown in FIG. 5, the insulating layer 30 in the portion of the other side in the radial direction of the main body of the electrode 20 is cut to form the non-insulating part 50. In the insulating layer 30, the circumferential direction is set as a longitudinal direction, and the axis O direction is set as a widthwise direction. The outer circumferential surface of the electrode 20 exposed to the outside in the radial direction of the non-insulating part 50 is connected to the distal end surfaces 21 of the electrode 20 via an intersection ridgeline.

Accordingly, when the electrochemical machining is performed, in addition to electrical connection between the distal end surface 21 of the electrode 20 and the inner surface of the machined hole 203, electrical connection between the portion to which the outer circumferential surface of the electrode 20 is exposed and the inner surface of the machined hole 203 can occur. Accordingly, the current density distribution of the side at which the non-insulating part 50 is formed at the position in the circumferential direction of the tool main body 10A, i.e., the other side in the radial direction of the tool main body 10A, can be increased.

Accordingly, since the machining amount of the side at which the non-insulating part 50 is formed can be further increased, as the machined hole 203 is machined to be more deepened toward the side at which the machining amount is large, the curved hole that is further curved can be easily formed.

Figure 6:
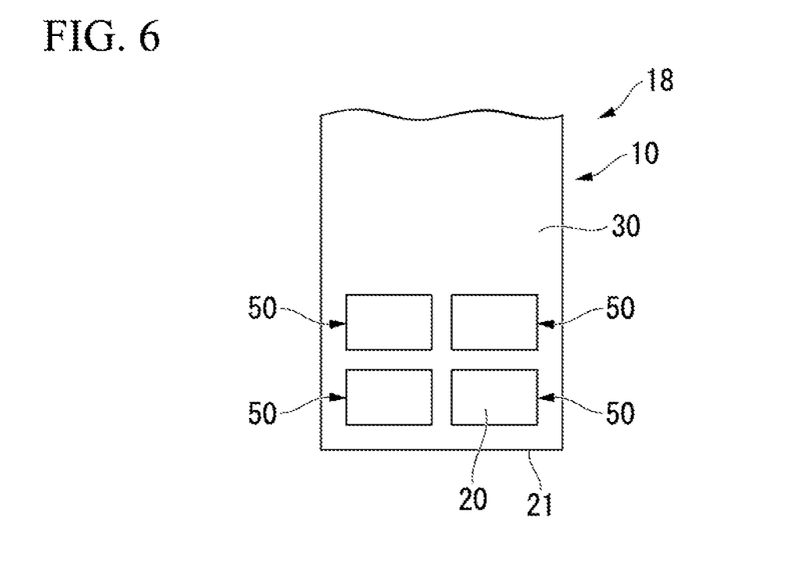
FIG. 6 is a side view of an electrochemical machining tool according to a third embodiment of the present invention, when seen from a non-insulating part side.

Next, an electrochemical machining tool 18 of a third embodiment will be described with reference to FIG. 6. In the third embodiment, the same components as of the second embodiment are designated by the same reference numerals, and detailed description thereof will not be repeated. The electrochemical machining tool 18 of the third embodiment has a different configuration of the non-insulating part 50 from the second embodiment.

That is, the plurality of (four in the embodiment) non-insulating parts 50 of the electrochemical machining tool 18 are formed to be spaced apart from each other at positions from the distal end of the tool main body 10A to the rear end side. In each of the non-insulating parts 50, a portion of the insulating layer 30 spaced apart from the distal end toward the rear end side has a rectangular shape having four sides constituted by two sides extending in the axis O direction and two sides extending in the circumferential direction. Each of the non-insulating parts 50 has a rectangular shape, two sides of which extend in the axis O direction and are set as short sides and two sides of which extend in the circumferential direction and are set as long sides. The four non-insulating parts 50 are disposed such that two parts are adjacent to each other in the axis O direction and two parts are adjacent to each other in the circumferential direction, i.e., two parts are spaced apart from each other in the axis O direction and two parts are spaced apart from each other in the circumferential direction. In other words, the four non-insulating parts 50 are disposed in a 2×2 matrix.

Here, the electrochemical machining tool 18 moving through the machined hole 203 has the distal end that can easily come in contact with the inner surface of the machined hole 203. On the other hand, in the electrochemical machining tool 18 of the embodiment, as the non-insulating part 50 is formed at the position spaced apart from the distal end to the rear end side, the insulating layer 30 is present at the distal end of the outer circumferential surface of the electrochemical machining tool 18. Accordingly, direct contact of the distal end of the electrode 20 in the electrochemical machining tool 18 with the inner surface of the machined hole 203 can be avoided.

Accordingly, since contact probability between the electrode 20 and the inner surface of the machined hole 203 can be decreased and a short circuit occurrence frequency between the electrode 20 and the inner surface of the machined hole 203 is decreased, machinability can be improved.

In addition, since the plurality of non-insulating parts 50 are formed to be spaced apart from each other in the axis O direction, a short circuit occurrence frequency between the electrode 20 and the inner surface of the machined hole 203 can be decreased while further increasing the current density distribution.

Further, since the plurality of non-insulating parts 50 are formed to be spaced apart from each other in the circumferential direction, as described above, a short circuit occurrence frequency between the electrode 20 and the inner surface of the machined hole 203 can be decreased while further increasing the current density distribution.

Figure 7:
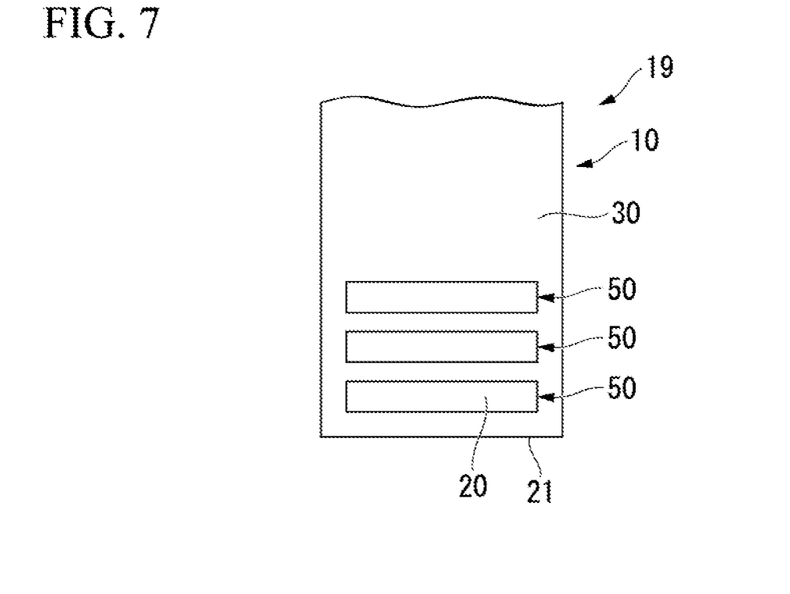
FIG. 7 is a side view of an electrochemical machining tool according to a variant of the third embodiment of the present invention, when seen from a non-insulating part side.

In addition, as an electrochemical machining tool 19 of a modified example of the third embodiment, for example, as shown in FIG. 7, the plurality of (three in the embodiment) non-insulating parts 50 extending in the circumferential direction in a slit shape may be formed to be spaced apart from the distal end of the tool main body 10A to the rear end side at intervals in the axis O direction.

Even in this case, as described above, machinability can be improved while decreasing a short circuit occurrence frequency between the electrode and the inner surface of the machined hole and increasing a current density.

In addition, the plurality of non-insulating parts 50 are not limited to this disposition but may be formed in at least one of the axis O direction and the circumferential direction at intervals. Further, a shape of each of the non-insulating parts 50 is not limited to the rectangular shape but may be employed as various shapes such as a circular shape, a polygonal shape, and so on.

Next, an electrochemical machining tool 12 of a fourth embodiment will be described with reference to FIG. 8. In the fourth embodiment, the same components as of the first embodiment are designated by the same reference numerals and detailed description thereof will not be repeated.

Figure 8:
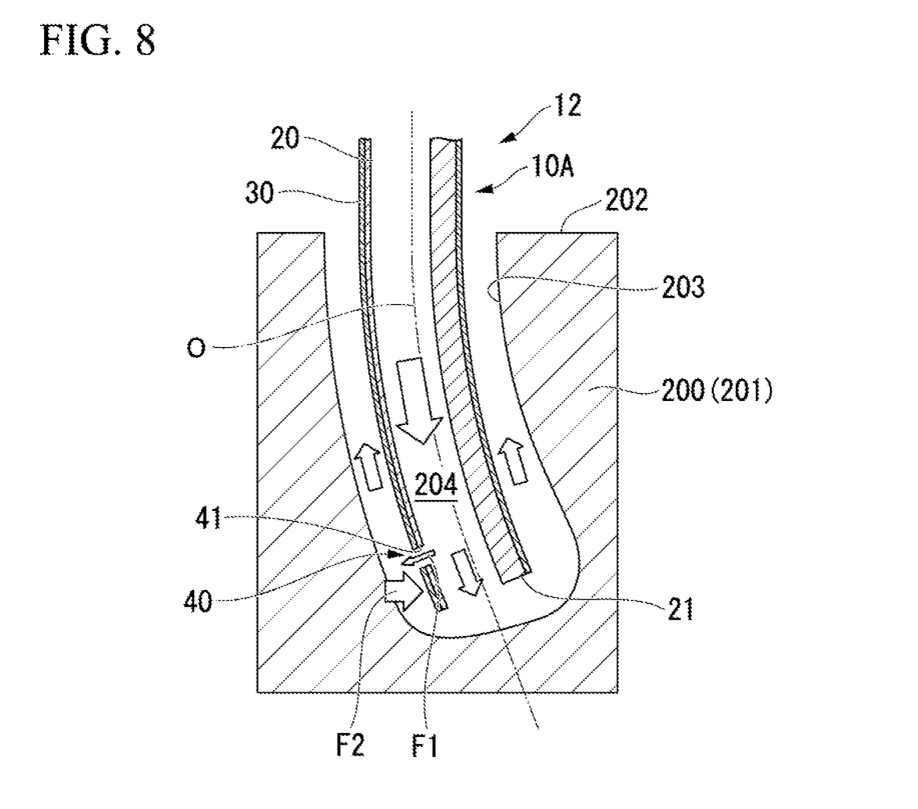
FIG. 8 is a longitudinal cross-sectional view of an electrochemical machining tool according to a fourth embodiment of the present invention.

As shown in FIG. 8, the electrochemical machining tool 12 of the embodiment is set such that a thickness of a portion of an opposite side of the fluid discharge part 40 with the axis O sandwiched therebetween is larger than the thickness of a portion of the fluid discharge part 40 side at the position in the circumferential direction of the electrode 20. That is, the thickness in the radial direction of the electrode 20 in the main body of the electrode 20 of the electrochemical machining tool 12 is set to be larger at the other side in the radial direction than at one side in the radial direction.

In addition, the thickness in the radial direction of the electrode 20 may be set to be gradually increased from one side in the radial direction toward the other side or increased in stages. In addition, a thickness of only a portion of one side in the radial direction of the electrode 20 may be set to be smaller than that of the other portion, or a thickness of only a portion of the other side in the radial direction of the electrode 20 may be set to be smaller than the thickness of the other portion.

Further, a portion in which a thickness in the radial direction of the electrode 20 is different may be formed in at least the distal end unit of the electrode 20 among positions in the axis O direction of the electrode 20, or may be formed in the entire region in the axis O direction.

Accordingly, since the current density distribution between the portion having a thickness larger than that of the distal end surface 21 of the electrode 20 and the inner surface of the machined hole 203 is increased, the machining amount of the portion having a large thickness of the electrode 20 at the position in the circumferential direction of the tool main body 10A can be increased. Accordingly, as the machined hole 203 is further deeply machined toward the side at which the machining amount is large, the curved hole that is further curved can be easily formed.

In addition, in the fourth embodiment, the non-insulating part 50 described in the second embodiment may be formed. Accordingly, the curved hole that is further curved can be more easily formed.

Next, an electrochemical machining tool 13 of a fifth embodiment will be described with reference to FIG. 9. In the fifth embodiment, the same components as of the first embodiment are designated by the same reference numerals and detailed description thereof will not be repeated.

Figure 9:
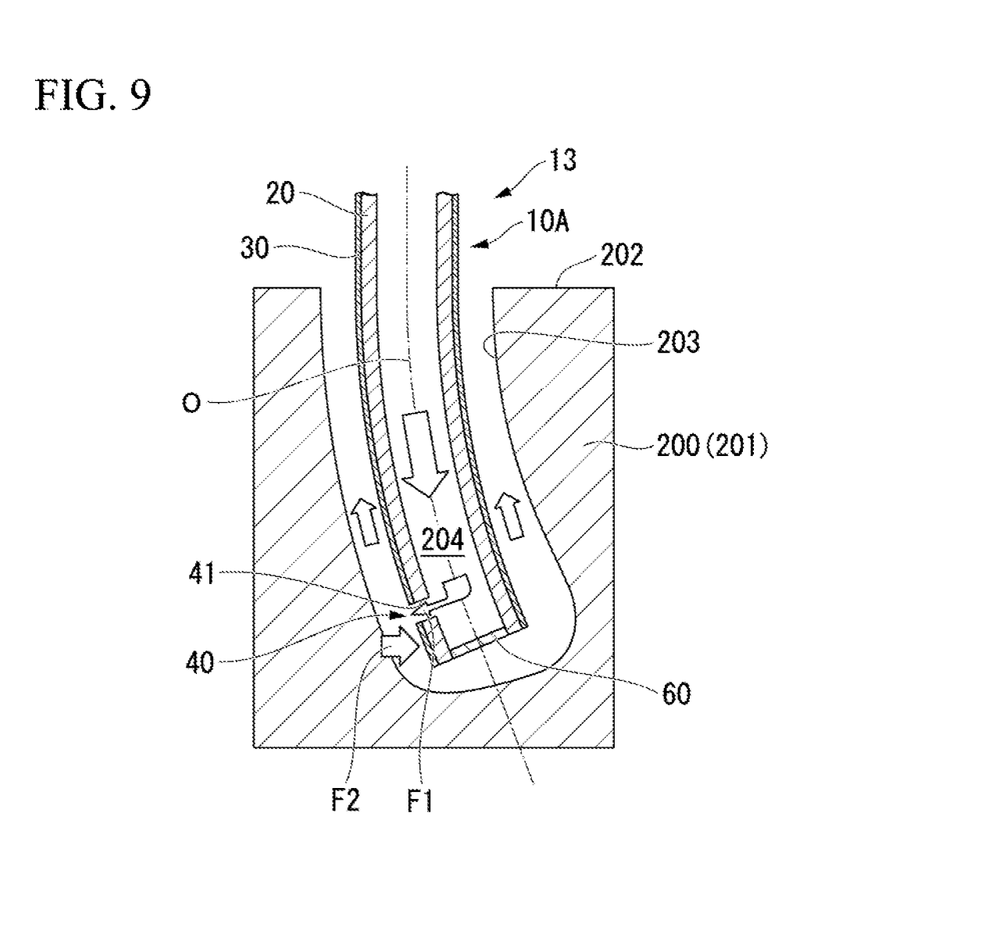
FIG. 9 is a longitudinal cross-sectional view of an electrochemical machining tool according to a fifth embodiment of the present invention.

As shown in FIG. 9, the electrochemical machining tool 13 of the embodiment includes a distal end lid portion 60 formed at the distal end of the tool main body 10A. The distal end lid portion 60 is formed of a conductive material such as stainless steel or the like, and closes the distal end opening of the electrode 20. The distal end lid portion 60 forms the same shape as the distal end opening of the electrode 20 when seen in the axis O direction, and forms a plate shape having a substantially uniform thickness in the axis O direction. As the distal end lid portion 60 is fitted into the distal end opening of the electrode 20, the distal end opening of the electrode 20 is closed. Accordingly, the distal end lid portion 60 is electrically connected to the electrode 20.

In addition, an outer circumferential side of the distal end lid portion 60 may be attached to an inner circumferential surface of the electrode 20 through, for example, welding or the like. The distal end lid portion 60 may be attached to be stacked on the distal end surface 21 of the electrode 20. The distal end lid portion 60 may be separately formed from the electrode 20 or may be integrally formed with the electrode 20.

In the above-mentioned electrochemical machining tool 13, in addition to electrical connection between the distal end surface 21 of the electrode 20 and the machined hole 203, according to electrical connection between the distal end lid portion 60 electrically connected to the electrode 20 and the inner surface of the machined hole 203, the workpiece 200 is melted, and the machined hole 203 is more deeply formed.

In addition, as a result of closing the distal end opening of the electrode 20 by installing the distal end lid portion 60, as the entire electrolyte 204 is discharged from the fluid discharge part 40, a discharge amount of the electrolyte 204 from the fluid discharge part 40 can be increased. Accordingly, since the fluid acting force F1 and the reaction force F2 to the inner surface of the machined hole 203 can be increased, the tool main body 10A can be largely displaced by the other side in the radial direction. Accordingly, the curved hole having a large curvature can be more easily formed.

Further, the non-insulating part 50 described in the second embodiment may be formed at the electrochemical machining tool 13 of the fifth embodiment. A thickness of the other side in the radial direction of the electrode 20 of the electrochemical machining tool 13 may be set to be larger than the thickness of one side in the radial direction. Accordingly, the curved hole that is further curved can be more easily formed.

Next, an electrochemical machining tool 14 of a sixth embodiment will be described with reference to FIG. 10. In the sixth embodiment, the same components as of the fifth embodiment are designated by the same reference numerals and detailed description thereof will not be repeated.

Figure 10:
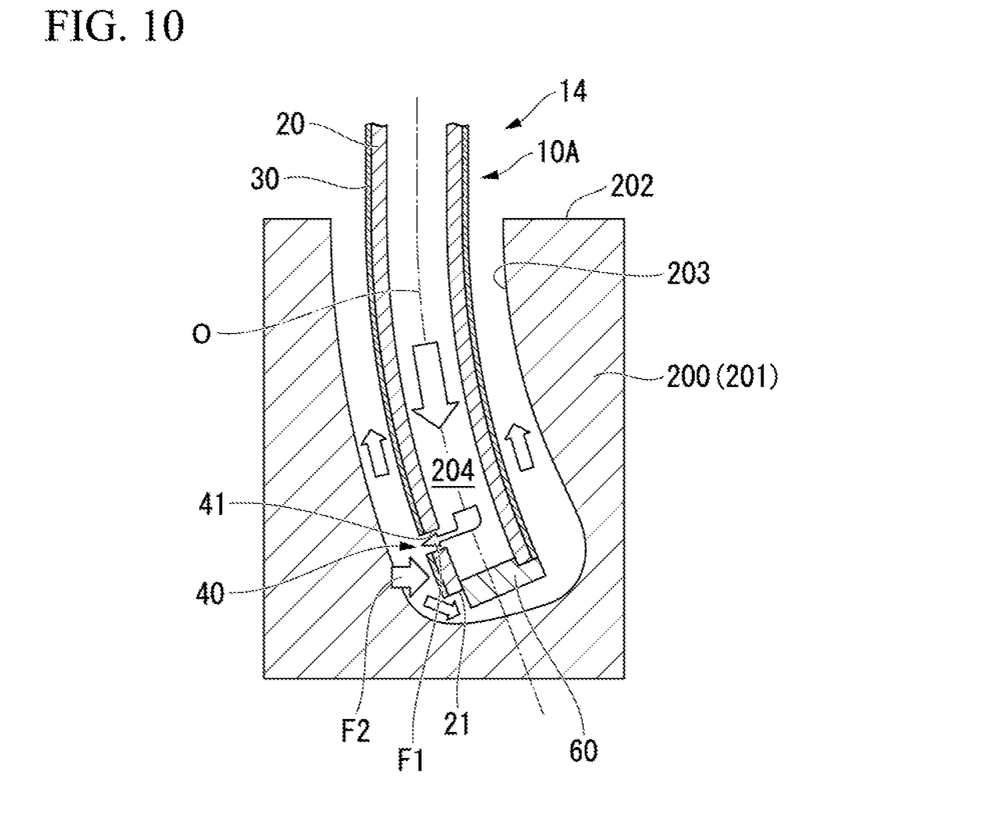
FIG. 10 is a longitudinal cross-sectional view of an electrochemical machining tool according to a sixth embodiment of the present invention.

As shown in FIG. 10, in the electrochemical machining tool 14 of the embodiment, the distal end lid portion 60 is stacked on the distal end surface 21 of the electrode 20 such that the portion of the distal end surface 21 of the electrode 20 near the fluid discharge part 40 is exposed to the distal end side. That is, the distal end lid portion 60 is stacked on a portion other than the portion of one side in the radial direction of the distal end surface 21 of the electrode 20, and thus the distal end opening of the electrode 20 is closed.

As the distal end lid portion 60 is disposed to be biased to an opposite side of the fluid discharge part 40 at the position in the circumferential direction of the tool main body 10A, i.e., the other side in the radial direction, the current density distribution between the distal end lid portion 60 and the inner surface of the machined hole 203 is increased at the other side in the radial direction opposite to the fluid discharge part 40. Accordingly, since the machining amount of the opposite side of the fluid discharge part 40 at the position in the circumferential direction of the tool main body 10A is increased, as the machined hole 203 is machined to be further deepened toward the side at which the machining amount is large, the curved hole that is further curved can be formed.

Figure 11:
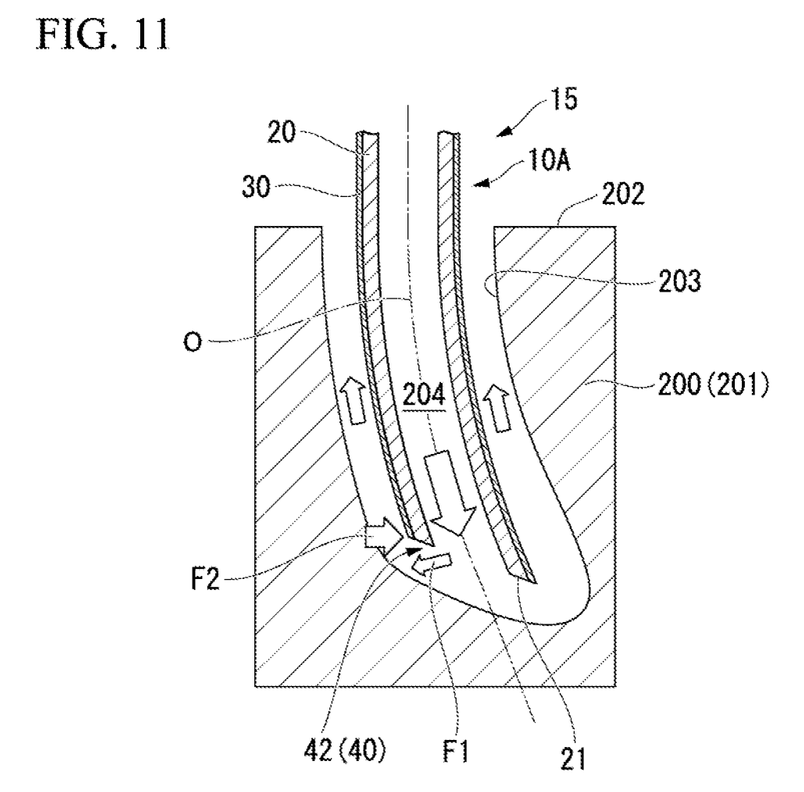
FIG. 11 is a longitudinal cross-sectional view of an electrochemical machining tool according to a seventh embodiment of the present invention.

Next, an electrochemical machining tool 15 of a seventh embodiment will be described with reference to FIG. 11. In the seventh embodiment, the same components as of the first embodiment are designated by the same reference numerals and detailed description thereof will not be repeated.

While the hole part 41 is employed as the fluid discharge part 40 in the first embodiment, the seventh embodiment is distinguished from the first embodiment in that a cutout part 42 is adopted as the fluid discharge part 40.

That is, the cutout part 42 serving as the fluid discharge part 40 is formed by cutting at least a portion in the circumferential direction of the tool main body 10A from the distal end side to the rear end side. In the embodiment, as the cutout part 42 is obliquely cut out from the other side in the radial direction of the tool main body 10A to one side and from the distal end toward the rear end, the cutout part 42 is formed. Accordingly, the distal end surface 21 of the tool main body 10A has a bamboo spear shape, and one side in the radial direction of the tool main body 10A is retracted to a farther rear side than the other side.

In addition, a slit formed by simply cutting out one side in the radial direction of the tool main body 10A in a linear shape from the distal end of the tool main body 10A toward the rear end may be employed as the cutout part 42. That is, the cutout part 42 may be formed such that at least a portion in the circumferential direction of the distal end surface 21 of the tool main body 10A is retracted to a farther rear side than the other portion of the distal end surface 21.

In the electrochemical machining tool 15 of the seventh embodiment, the electrolyte 204 is discharged from the distal end of the electrode 20, and a portion thereof is discharged toward the outside in the radial direction of the tool main body 10A via the cutout part 42 serving as the fluid discharge part 40. Here, like the first embodiment, as the electrolyte 204 discharged via the cutout part 42 applies the fluid acting force F1 to the inner surface of the machined hole 203, the reaction force F2 is applied to the tool main body 10A. Accordingly, like the first embodiment, the curved hole can be easily formed. In addition, as the flow rate of the electrolyte 204 is adjusted, since the magnitudes of the fluid acting force F1 and the reaction force F2 may be arbitrary values, the curved hole having a desired curvature can be formed.

Then, in the embodiment, in particular, in comparison with the case in which the hole part 41 is used as the fluid discharge part 40, variations of the fluid acting force F1 and the reaction force F2 to the inner surface of the machined hole 203 according to the variation in flow rate of the electrolyte 204 are reduced. That is, for example, like the first embodiment, when the hole part 41 is adopted as the fluid discharge part 40, as the electrolyte 204 is throttled by the hole part 41, the fluid acting force F1 is locally increased. On the other hand, in the embodiment, in comparison with the case in which the hole part 41 is used as the fluid discharge part 40, since the electrolyte 204 is widely discharged to the outside in the radial direction, variations of the fluid acting force F1 and the reaction force F2 when the flow rate of the electrolyte 204 is varied are reduced. Accordingly, since setting of the fluid acting force F1 and the reaction force F2 is more strictly performed based on the flow rate of the electrolyte 204, fine adjustment of the curvature of the curved hole can be easily performed.

In addition, in the seventh embodiment, the non-insulating part 50 described in the second embodiment may be formed, or a thickness of the other side in the radial direction of the electrode 20 may be set to be larger than the thickness of one side in the radial direction. Accordingly, the curved hole that is further curved can be more easily formed.

Figure 12:
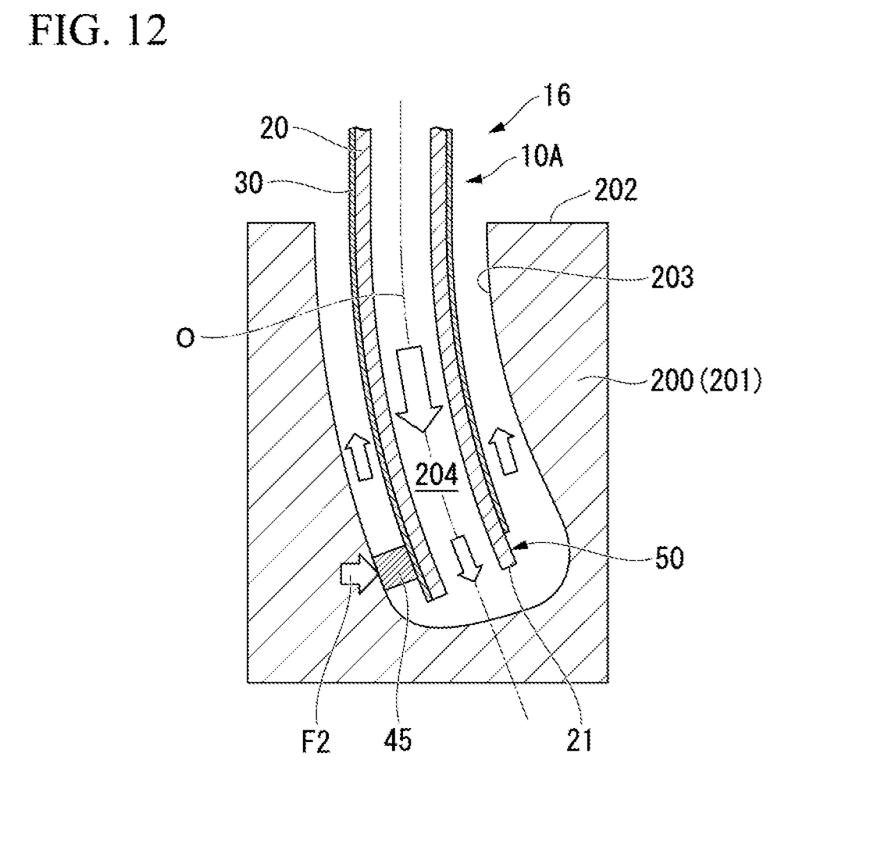
FIG. 12 is a longitudinal cross-sectional view of an electrochemical machining tool according to an eighth embodiment of the present invention.

Next, an electrochemical machining tool 16 of an eighth embodiment will be described with reference to FIG. 12. In the eighth embodiment, the same components as of the first embodiment are designated by the same reference numerals and detailed description thereof will not be repeated.

In the electrochemical machining tool 16 of the eighth embodiment, a convex part 45 is formed instead of the fluid discharge part 40 of the first embodiment. The convex part 45 is formed to protrude from the outer circumferential surface of the tool main body 10A toward the outside in the radial direction at a portion at a position in the circumferential direction of the tool main body 10A, i.e., a portion at one side in the radial direction of the tool main body 10A. The convex part 45 is formed at the outer circumferential surface of the distal end unit of the tool main body 10A.

In the embodiment, like the insulating layer 30, the convex part 45 is formed of a material having electric insulation such as a resin or the like, and a longitudinal cross-sectional shape including the axis O has a rectangular shape. In addition, the convex part 45 may be separately formed from the insulating layer 30 to be fixed to the insulating layer 30, or may be integrally formed with the insulating layer 30.

Further, in the tool main body 10A of the electrochemical machining tool 16 of the eighth embodiment, like the first embodiment, the non-insulating part 50 configured to expose the outer circumferential surface of the electrode 20 to the outside in the radial direction is formed at a portion of an opposite side of the convex part 45 at the position in the circumferential direction of the tool main body 10A with the axis O sandwiched therebetween, i.e., a portion of the other side in the radial direction of the tool main body 10A.

In addition, like the third embodiment, the non-insulating part 50 may be formed at a place spaced apart from the distal end of the tool main body 10A to the rear end side, or the plurality of non-insulating parts 50 may be formed to be spaced apart from each other in the axis O direction and the circumferential direction. Accordingly, contact probability between the electrode 20 and the machined hole 203 is decreased, and machinability can be improved.

When the machining is performed by the electrochemical machining tool 16, like the first embodiment, the moving mechanism 1 is slowly moved toward the workpiece 200 while sequentially supplying the electrolyte 204 into the electrochemical machining tool 16 guided by the guide unit 3. Here, a pushing force of the electrochemical machining tool 16 is adjusted by the pushing force control device while adjusting the flow rate of the electrolyte 204 by the flow rate control device.

Then, a space between the tool main body 10A and the inner surface of the machined hole 203 is filled with the electrolyte 204 discharged from the distal end of the electrode 20, i.e., the distal end of the tool main body 10A, and then, as the electrical connection is performed by an electrical connection unit (not shown), the workpiece 200 is melted and the machined hole 203 is more deeply machined.

Here, in the embodiment, when the tool main body 10A is moved into the machined hole 203 as the tool main body 10A is pushed by the moving mechanism 1 of the electrochemical machining system 100, the convex part 45 of the portion in the circumferential direction of the tool main body 10A abuts the inner surface of the machined hole 203. Then, in the tool main body 10A, the reaction force F2 is applied to the opposite side of the convex part 45, i.e., the other side in the radial direction.

Then, since the electrode 20 has flexibility, the tool main body 10A is displaced to be curved in a direction of the reaction force F2. In the embodiment, since the convex part 45 is formed at the distal end unit of the tool main body 10A, the distal end unit of the tool main body 10A is displaced in the direction of the reaction force F2, i.e., toward the other side in the radial direction. Then, the distal end surface 21 of the electrode 20 and the inner surface of the machined hole 203 approach each other according to the magnitude of the displacement amount, and as a result, the current density distribution between the distal end surface 21 of the electrode 20 and the inner surface of the machined hole 203 in a region at which they approach each other is locally increased. Accordingly, the machining amount of the side at which the tool main body 10A is displaced by the reaction force F2 at the position in the circumferential direction of the tool main body 10A is increased.

Accordingly, since the machined hole 203 is more deeply machined toward the side at which the machining amount is large, as the electrochemical machining tools 16 are sequentially pushed by the moving mechanism 1, the electrochemical machining tool 16 is moved toward the side at which the machining amount is large, i.e., the other side in the radial direction. That is, the electrochemical machining tool 16 is gradually curved toward the other side in the radial direction as it moves into the machined hole 203. Accordingly, the curved hole can be easily formed.

Meanwhile, the magnitude of the reaction force F2 applied to the tool main body 10A is increased as the pushing force of the electrochemical machining tool 16 by the moving mechanism 1 is increased and the force applied by the convex part 45 to the inner surface of the machined hole 203 is increased. Accordingly, as the pushing force of the electrochemical machining tool 16 by the moving mechanism 1 is adjusted, the displacement amount to the other side in the radial direction of distal end unit of the tool main body 10A can be determined. Accordingly, as the pushing force of the electrochemical machining tool 16 is arbitrarily varied by the pushing force control device, the curved hole having a desired curvature can be easily formed.

In addition, in the embodiment, since the non-insulating part 50 is formed at the opposite side of the convex part 45 with the axis O sandwiched therebetween, when the electrolytic machining is performed, in addition to the electrical connection between the distal end surface 21 of the electrode 20 and the inner surface of the machined hole 203, the electrical connection between the portion to which the outer circumferential surface of the electrode 20 is exposed and the inner surface of the machined hole 203 occurs. Accordingly, the current density distribution of the other side in the radial direction of the tool main body 10A can be increased more. Accordingly, since the machining amount of the side at which the non-insulating part 50 is formed can be more increased, the machined hole 203 is more deeply machined toward the side at which the machining amount is large, and the curved hole that is further curved can be easily formed.

In addition, in the eighth embodiment, the non-insulating part 50 may not necessarily be formed, i.e., the insulating layer 30 may be coated on the entire region in the circumferential direction and the axis O direction of the outer circumferential surface of the electrode 20. Even in this case, since the reaction force F2 to the other side in the radial direction can be obtained as the convex part 45 abuts the inner surface of the machined hole 203, the curved hole that is further curved can be formed.

Further, like the fourth embodiment, a thickness of the other side in the radial direction of the electrode 20 of the electrochemical machining tool 16 may be set to be larger than the thickness of one side in the radial direction. Accordingly, the curved hole that is further curved can be more easily formed.

Hereinabove, while the embodiments of the present invention have been described in detail, the present invention is not limited thereto but a few design changes may be made without departing from the technical scope of the present invention.

For example, in the embodiments, while the aspect in which the plurality of electrochemical machining tools 10, 11, 12, 13, 14, 15, 16 and 17 are simultaneously moved to advance and retract by the moving mechanism 1 has been described, the electrochemical machining tools 10, 11, 12, 13, 14, 15, 16 and 17 may be configured to be manually and separately moved to advance and retract. In addition, the electrochemical machining tools 10, 11, 12, 13, 14, 15, 16 and 17 may be moved to advance and retract without using the guide unit 3.

Further, in the embodiments, while the example in which the turbine blade 201 of the gas turbine is used as the workpiece 200 has been described, the present invention is not limited thereto but another product may be employed as the workpiece 200.

REFERENCE SIGNS LIST 1 moving mechanism
2 grip unit
3 guide unit
4 guide hole
10 electrochemical machining tool
10A tool main body
11 to 19 electrochemical machining tool
20 electrode
21 distal end surface
30 insulating layer
40 fluid discharge part
41 hole part
42 cutout part
45 convex part
50 non-insulating part
60 distal end lid portion
100 electrochemical machining system
200 workpiece
201 turbine blade
202 distal end
203 machined hole
204 electrolyte
O axis
F1 fluid acting force
F2 reaction force

The invention claimed is:

1. An electrochemical machining tool comprising:
   a tool main body which comprises
      an electrode having a tubular shape extending along an axis and formed of a conductive material having flexibility, the electrode being capable of flowing an electrolyte through an inside of the electrode toward a distal end side, and
      an insulating layer coated on an outer circumferential surface of the electrode so as to expose a distal end surface of the electrode, wherein a fluid discharge part configured to discharge the electrolyte flowing through the inside of the electrode toward an outside in a radial direction of the tool main body is formed at a portion of a position in a circumferential direction of the tool main body, and wherein a non-insulating part configured to expose only part of an outer circumferential surface of the electrode to the outside in the radial direction is formed at a portion of an opposite side of the fluid discharge part at a position in the circumferential direction of the tool main body with the axis sandwiched therebetween.

2. The electrochemical machining tool according to claim 1, wherein the fluid discharge part is a hole part passing through the electrode and the insulating layer in the radial direction.

3. The electrochemical machining tool according to claim 1, wherein the fluid discharge part is a cutout part cut out from a distal end of the tool main body toward a rear end.

4. The electrochemical machining tool according to claim 1, wherein a thickness of the electrode at the portion of the opposite side of the fluid discharge part with the axis sandwiched therebetween is set to be larger than a thickness of the electrode at the portion of the fluid discharge part at the position in the circumferential direction of the electrode.

5. The electrochemical machining tool according to claim 1, further comprising a distal end lid portion formed of a conductive material and configured to close a distal end opening of the electrode.

6. The electrochemical machining tool according to claim 5, wherein the distal end lid portion is stacked on the distal end surface to expose the portion of the fluid discharge part in the distal end surface of the electrode to the distal end side.

7. An electrochemical machining tool comprising a tool main body which comprises an electrode having a tubular shape extending along an axis and formed of a conductive material having flexibility, the electrode which is capable of flowing an electrolyte through an inside of the electrode toward a distal end side, and an insulating layer coated on only an outer circumferential surface of the electrode so as to expose a distal end surface of the electrode, wherein a convex part protruding from an outer circumferential surface of the insulating layer toward an outside in a radial direction is formed at a portion in a circumferential direction of the tool main body, and wherein a non-insulating part configured to expose only part of an outer circumferential surface of the electrode to the outside in the radial direction is formed at the distal end of the tool main body at a portion of an opposite side of the convex part at a position in the circumferential direction of the tool main body with the axis sandwiched therebetween.

8. The electrochemical machining tool according to claim 1, wherein the non-insulating part is formed at a position spaced apart from the distal end side of the tool main body to a rear end side of the tool main body.

9. The electrochemical machining tool according to claim 1, wherein the tool main body is provided with a plurality of non-insulating parts formed to be spaced apart from each other in an axial direction of the tool main body.

10. The electrochemical machining tool according to claim 1, wherein the tool main body is provided with a plurality of non-insulating parts formed to be spaced apart from each other in the circumferential direction of the tool main body.

11. An electrochemical machining system comprising:
   an electrochemical machining tool according to claim 1;
   a guide unit configured to guide the electrochemical machining tool to a predetermined advancing direction with respect to a workpiece; and
   a moving mechanism configured to move the electrochemical machining tool to advance.

12. An electrochemical machining tool comprising a tool main body which comprises an electrode having a tubular shape extending along an axis and formed of a conductive material having flexibility, the electrode which is capable of flowing an electrolyte through an inside of the electrode toward a distal end side, and an insulating layer coated on an outer circumferential surface of the electrode so as to expose a distal end surface of the electrode, wherein a fluid discharge part configured to discharge the electrolyte flowing through the inside of the electrode toward an outside in a radial direction of the tool main body is formed at a portion of a position in a circumferential direction of the tool main body, and wherein a thickness of the electrode at the portion of an opposite side of the fluid discharge part with the axis sandwiched therebetween is set to be larger than a thickness of the electrode at the portion of the fluid discharge part at the position in a circumferential direction of the electrode.

13. The electrochemical machining tool according to claim 12, wherein the fluid discharge part is a hole part passing through the electrode and the insulating layer in the radial direction.

14. The electrochemical machining tool according to claim 12, wherein the fluid discharge part is a cutout part cut out from a distal end of the tool main body toward a rear end.

15. The electrochemical machining tool according to claim 12, further comprising a distal end lid portion formed of a conductive material and configured to close a distal end opening of the electrode.

16. The electrochemical machining tool according to claim 15, wherein the distal end lid portion is stacked on the distal end surface to expose the portion of the fluid discharge part in the distal end surface of the electrode to the distal end side.

17. An electrochemical machining system comprising:
   an electrochemical machining tool according to claim 12;
   a guide unit configured to guide the electrochemical machining tool to a predetermined advancing direction with respect to a workpiece; and
   a moving mechanism configured to move the electrochemical machining tool to advance.

* * * * *